United States Patent
McDonald

(10) Patent No.: US 12,037,277 B2
(45) Date of Patent: *Jul. 16, 2024

(54) DRINKING WATER TREATMENT SYSTEM

(71) Applicant: Hugh Stephen McDonald, Alamo, CA (US)

(72) Inventor: Hugh Stephen McDonald, Alamo, CA (US)

( * ) Notice: Subject to any disclaimer, the term of this patent is extended or adjusted under 35 U.S.C. 154(b) by 662 days.

This patent is subject to a terminal disclaimer.

(21) Appl. No.: 17/199,111

(22) Filed: Mar. 11, 2021

(65) Prior Publication Data

US 2021/0198137 A1  Jul. 1, 2021

Related U.S. Application Data

(63) Continuation of application No. 15/488,356, filed on Apr. 14, 2017, now Pat. No. 10,954,151.

(Continued)

(51) Int. Cl.
*C02F 9/20* (2023.01)
*B01D 39/20* (2006.01)
(Continued)

(52) U.S. Cl.
CPC ............... *C02F 9/20* (2023.01); *C02F 1/005* (2013.01); *C02F 1/283* (2013.01); *C02F 1/32* (2013.01);
(Continued)

(58) Field of Classification Search
CPC .. C02F 1/005; C02F 1/283; C02F 1/32; C02F 1/325; C02F 1/444; C02F 1/001;
(Continued)

(56) References Cited

U.S. PATENT DOCUMENTS

| | | |
|---|---|---|
| 3,926,556 A | 12/1975 | Boucher |
| 4,296,066 A | 10/1981 | Schenck |

(Continued)

FOREIGN PATENT DOCUMENTS

| | | |
|---|---|---|
| CN | 203256071 | 10/2013 |
| CN | 104016442 | 9/2014 |

(Continued)

OTHER PUBLICATIONS

Chevremont et al., Multivariate optimization of fecal bioindicator inactivation by coupling UV-A and UV-C LEDs. Desalination, Elsevier, 2012,285,pp. 219-225. 10.1016/j.desal.2011.10.006.

(Continued)

*Primary Examiner* — Liam Royce
(74) *Attorney, Agent, or Firm* — Knobbe, Martens, Olson & Bear, LLP

(57) ABSTRACT

A drinking water treatment system is disclosed. The system includes an ultraviolet (UV) light source and an adsorption medium positioned downstream of the UV light source. The UV light activates residual chlorine in water. The adsorption medium is configured to adsorb any remaining free chlorine from the water. Drinking water treatment systems are disclosed for point-of-use (POU) applications, such as tap-mounted countertop, under-counter, and/or commercial bottling applications, and for point-of-entry (POE).

20 Claims, 8 Drawing Sheets

Related U.S. Application Data

(60) Provisional application No. 62/323,485, filed on Apr. 15, 2016.

(51) Int. Cl.
  *C02F 1/00* (2023.01)
  *C02F 1/28* (2023.01)
  *C02F 1/32* (2023.01)
  *C02F 1/44* (2023.01)
  *C02F 9/00* (2023.01)

(52) U.S. Cl.
  CPC ............. *C02F 1/325* (2013.01); *C02F 1/444* (2013.01); *C02F 9/00* (2013.01); *B01D 39/2062* (2013.01); *B01D 2221/02* (2013.01); *C02F 2201/007* (2013.01); *C02F 2201/3222* (2013.01); *C02F 2201/3227* (2013.01); *C02F 2307/06* (2013.01); *C02F 2307/10* (2013.01)

(58) Field of Classification Search
  CPC ........ C02F 1/281; C02F 7259/20; C02F 9/20; C02F 9/00; C02F 2201/007; C02F 2201/3222; C02F 2201/3227; C02F 2201/3228; C02F 2307/06; C02F 2307/10; C02F 2305/10; B01D 39/2062; B01D 2221/02
  See application file for complete search history.

(56) References Cited

U.S. PATENT DOCUMENTS

| | | |
|---|---|---|
| 5,043,080 A | 8/1991 | Cater et al. |
| 5,078,889 A * | 1/1992 | Higgins ............ B01J 20/28004 210/683 |
| 5,266,215 A | 11/1993 | Engelhard |
| 5,529,689 A | 6/1996 | Korin |
| 5,582,741 A | 12/1996 | Kenmoku et al. |
| 5,628,895 A | 5/1997 | Zucholl |
| 5,843,309 A | 12/1998 | Mancil |
| 5,891,329 A | 4/1999 | Massholder |
| 5,925,257 A | 7/1999 | Albelda |
| 6,090,296 A | 7/2000 | Oster |
| 6,099,735 A | 8/2000 | Kelada |
| 6,419,821 B1 | 7/2002 | Gadgil |
| 6,533,930 B1 | 3/2003 | Kool |
| 6,740,245 B2 | 5/2004 | Johnson |
| 6,767,458 B2 | 7/2004 | Safta |
| 6,773,608 B1 | 8/2004 | Hallett |
| 6,814,876 B1 | 11/2004 | Neal |
| 7,166,216 B2 | 1/2007 | Woodward, Jr. et al. |
| 7,431,847 B2 | 10/2008 | Kaas |
| 7,662,276 B2 | 2/2010 | Larsson |
| 7,662,293 B2 | 2/2010 | Brolin et al. |
| 7,842,182 B2 | 11/2010 | Ried |
| 8,167,141 B2 | 5/2012 | Knipmeyer et al. |
| 8,414,779 B2 | 4/2013 | Levy |
| 8,877,067 B2 | 11/2014 | Sichel |
| 9,365,437 B2 | 6/2016 | Zhu et al. |
| 10,954,151 B1 * | 3/2021 | McDonald ............ C02F 1/283 |
| 2002/0046569 A1 | 4/2002 | Faqih |
| 2004/0109788 A1 | 6/2004 | Li |
| 2004/0140269 A1 | 7/2004 | Chang |
| 2006/0216193 A1 | 9/2006 | Johnson |
| 2006/0219630 A1 | 10/2006 | Abe |
| 2007/0086912 A1 | 4/2007 | Dowling |
| 2009/0145855 A1 | 6/2009 | Day |
| 2010/0065484 A1 | 3/2010 | Bruggink |
| 2010/0209294 A1 | 8/2010 | Owen |
| 2010/0296971 A1 | 11/2010 | Gaska |
| 2013/0023448 A1 | 1/2013 | Glasscott |
| 2015/0158750 A1 | 6/2015 | Schiffmann et al. |
| 2017/0280737 A1 | 10/2017 | Liao |

FOREIGN PATENT DOCUMENTS

| | | |
|---|---|---|
| CN | 104455553 | 3/2015 |
| CN | 104649486 | 5/2015 |
| DE | 102007055449 | 12/2008 |
| KR | 10-2005-0063377 | 6/2005 |
| KR | 10-2009-0027908 | 3/2009 |
| KR | 10-2015-0026993 | 3/2015 |
| KR | 10-2015-0044661 | 4/2015 |

OTHER PUBLICATIONS

Qin et al., Kinetic models and pathways of ronidazole degradation by chlorination, UV irradiation and UV/chlorine processes, Water Research 65:271-281 (2014).

* cited by examiner

DRINKING WATER TREATMENT SYSTEM

CROSS-REFERENCE TO RELATED APPLICATIONS

This application is a continuation of U.S. application Ser. No. 15/488,356, entitled "DRINKING WATER TREATMENT SYSTEM," filed Apr. 14, 2017 (issued as U.S. Pat. No. 10,954,151 on Mar. 23, 2021), which claims the benefit of U.S. Provisional Application No. 62/323,485, entitled "MODULAR TAP-MOUNTED WATER TREATMENT SYSTEM," filed Apr. 15, 2016, the entire disclosures of which are incorporated herein by reference for all purposes.

BACKGROUND

Field

The present disclosure relates generally to point-of-use (POU), point-of-entry (POE), and/or commercial drinking water treatment systems.

Description of the Related Art

Household water treatment systems are needed, even in developed nations, because of the ever-increasing contamination of existing water supply sources from human activities. Aging of existing infrastructure distribution systems (e.g., pipelines) for potable water presents significant challenges for the future. An example of the challenges is an increasing rate of leaching heavy metals and other materials of pipeline construction as the systems deteriorate, and as water quality characteristics change due to changes in water supply sources. These changes in water supply sources and associated changes in water quality characteristics result in large part from increasing demands of water from existing sources due to population growth, and the shift to new marginal water supplies due to climate change impacts. In addition, population growth has significantly increased demand for potable water and also increased the volume of treated wastewater discharged to streams and groundwater basins that are sources of our drinking water supplies. Thus, potable water supplied today tends to include treated water derived directly or indirectly from wastewater.

The consequences of having treated wastewater can be, for example, increased levels of trace contaminants, such as, personal care products and pharmaceuticals (PCPP's), many of which are endocrine disrupter compounds (EDC's). There is also a growing concern over bacterial regrowth that takes place in a distribution system due to long travel times for water in the system, from the water plant to the end user. Consequently, the U.S. Environmental Protection Agency (EPA) has established minimum chlorine residual disinfection concentrations for public water utilities that use surface water or ground water under the influence of surface water (Subpart H systems). The residual disinfectant concentration of chlorine in the water entering the distribution system cannot be less than 0.2 mg/L for more than 4 hours [40 CFR 141.72(a)(3) & (b)(2)]. And, the residual disinfectant concentration in the distribution system cannot be undetectable in more than 5% of the samples each month, for any 2 consecutive months that the system serves water to the public [40 CFR 141.72(a)(4) & (b)(3)]. Therefore, residual chlorine is typically present in public water supplies in the U.S. at the point-of-entry (POE) and point-of-use (POU), such as at household and/or commercial user water supplies and taps. Also, bottled water and other water commercially sold may contain chlorine. This chlorine residual can be distasteful and raises potential concerns by many consumers.

SUMMARY OF THE INVENTION

The systems, methods, and devices described herein each have several aspects, no single one of which is solely responsible for its desirable attributes. Without limiting the scope of this invention as expressed by the claims which follow, some features are described briefly below. After considering this description, and particularly after reading the section entitled "Detailed Description of Some Embodiments," one will understand the advantageous features of the systems, methods, and devices described herein.

In one aspect, a treatment system for potable liquids is disclosed. The system includes one or more ultraviolet UV light sources configured to emit UV light into potable liquid to activate residual chlorine in the liquid. The system also includes an adsorption medium positioned in a flow path downstream of the UV light source. The adsorption medium is configured to adsorb any remaining free chlorine from the potable liquid.

In another aspect, a method for treating water within a treatment device is disclosed. The method includes activating residual chlorine in potable water at an activation stage along a flow path within the treatment device by exposure to UV light within the treatment device. The method also includes adsorbing remaining free chlorine in the potable water in the flow path within the treatment device downstream of the activation stage.

In one aspect, a modular tap-mounted water treatment system is disclosed. The system includes an ultraviolet (UV) light module configured to mount on a household tap and emit UV light into a flow path to activate residual chlorine. The system also includes an adsorption module configured to mount downstream of the UV light module. The adsorption module is configured to connect to the UV light module and adsorb remaining free chlorine from the flow path.

In another aspect, a water treatment system shaped and sized for use on a countertop is disclosed. The system includes an ultraviolet (UV) light module integrated with a countertop housing configured to emit UV light into a flow path to activate residual chlorine. The system can also include an adsorption module integrated with the countertop housing positioned in the flow path downstream of the UV module.

BRIEF DESCRIPTION OF THE DRAWINGS

Embodiments will now be described with reference to the following drawings, which are provided by way of example, and not by way of limitation. Reference numerals are shown on the drawings that identify identical or functionally similar elements.

DETAILED DESCRIPTION OF THE PREFERRED EMBODIMENT

Figure 1:
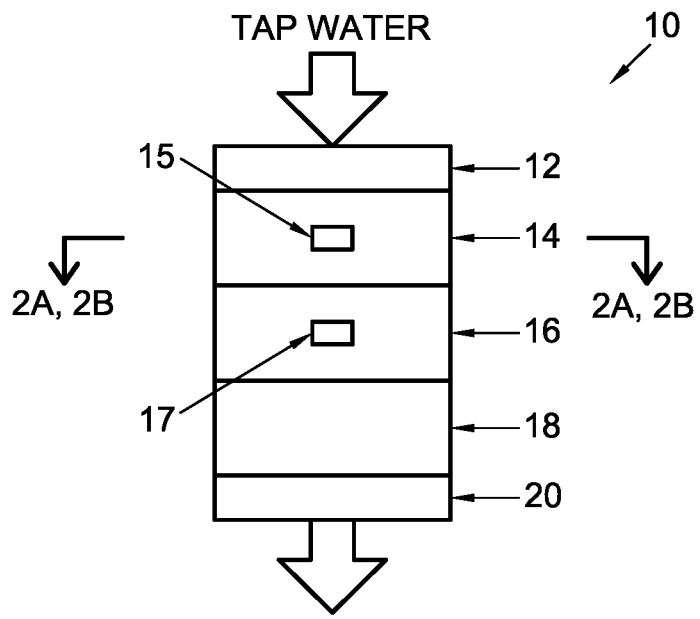
FIG. 1 is a schematic of a modular water treatment system, according to some embodiments.

Treated water from public water supplies is typically considered safe, such that disinfection is not usually the primary motivation for point-of-use water treatment. However, water sources for tap water and/or other potable water can include a number of contaminants, including heavy metals, pathogens (e.g., bacteria, viruses, and parasites), pesticides, trace organics, and/or endocrine disruptor compounds (EDC's). Heavy metals and pathogens are well understood and regulated. Pathogens are typically treated in public water supplies through approved disinfection processes at water treatment facilities. Pesticides, trace organics and EDC's, however, are relatively little understood or regulated at this time. Typical household water treatment, particularly in developed countries, includes adsorption media configured to remove metals, some organics, and residual chlorine. However, traditional UV processes for both disinfection of public water supplies and POU/POE devices are typically designed for the purpose of disinfecting pathogens. Furthermore, traditional processes often use relatively high power mercury vapor bulbs that emit light at relatively lower UVC wavelengths (e.g., 254.7 nm). The traditional UV processes typically utilize 254.7 nm as their wavelength for disinfection because it is shown to be an effective wavelength for inactivating bacteria through absorption by cellular RNA and DNA. This absorption of UV energy creates double bonds (or dimers) causing photochemical damage, most commonly of thymine in the DNA of bacteria and viruses, keeping them from replicating. Water is typically filtered upstream of UV treatment to remove particulate matter so that the UV light can better penetrate the water and maximize effectiveness.

Embodiments described herein employ a UV-oxidation process that operates differently from the above-described traditional UV-disinfection processes. The UV-oxidation process can oxidize and destroy C—H and C—C bonds that are often present in EDC's and always present in trace organics by definition. In some embodiments, the UV light activates or catalyzes oxidants, such as residual chlorine in pre-treated water, for example public water supplies in the U.S. The UV spectrum is generally considered to include wavelengths between about 100 nm and about 400 nm. The UV spectrum is often divided into three wavelength ranges referred to as UVA, UVB, and UVC. The UVA spectrum is generally considered to include wavelengths centered in the range of about 315 nm to about 400 nm. Nevertheless, commercial UVA light sources can be designated with a nominal wavelength of about 410 nm. The UVB spectrum is generally considered to include wavelengths centered in the range of about 280 nm to about 315 nm. The UVC spectrum is generally considered to include wavelengths centered in the range of about 100 nm to about 280 nm.

In view of the desired function of UV light for activation of chlorine in order to more effectively oxidize organic contaminant, the UV light source need not be centered at 254.7 nm (UVC). Instead, embodiments can include UVA or UVB spectrum light sources. Thus, in some embodiments, a UV light source with a distribution centered in the wavelength range of 270 nm to 425 nm is employed. For example a UVB light source can be employed with a wavelength distribution centered in a range of about 270 nm to 290 nm (e.g., nominal wavelength close to 280 nm) or 280 nm to 315 nm. In another embodiment, a UVA light source can be employed with a wavelength distribution centered in a range of about and 310 nm to 410 nm (e.g., nominal wavelength close to 405 nm), is employed, which is more effective in killing viruses and promoting oxidation reactions than light with wavelength distributions centered close to 254.7 nm. In some embodiments, a POU, POE and/or commercial drinking water treatment device is provided, for example for household or commercial use or wherever water is dispensed into a receptacle (e.g., cup, glass, bottle) for consumption, storage or transportation in the receptacle. In some embodiments, the UV-catalyzed oxidation process is performed upstream of adsorption treatment that can remove chlorine from the water, such that residual chlorine is available to be activated by the UV light.

Embodiments of the present disclosure provide liquid, and particularly drinking water, treatment systems (e.g., tap-mountable, countertop, under-counter, and point-of-entry water treatment systems) that are capable of deactivating and/or eliminating various contaminants commonly found in tap water and/or other potable water. In embodiments described herein, modular water treatment systems include multiple water treatment modules. For example, in various embodiments, the system can include an ultraviolet module (e.g., a UV-chlorine catalyzed oxidation module), an adsorption module, and/or a filtration module (e.g., membrane filtration module). Various embodiments can include any number of the modules described herein. The selection of a preferred sequence of treatment stages and the number of such stages can be affected by the specific source water to be treated, the speed of the water flow through the modules, and the UV intensity, etc. For example, the selection may be any one module, any combination of two modules, any combination of three modules, or any combination of four or more modules. While certain embodiments are described below, these embodiments are presented by way of example only. The principles and advantages of the systems taught herein can be obtained in different ways as defined and covered by the claims.

FIG. 1 is a schematic of a modular water treatment system 10, according to some embodiments. In some embodiments, the system 10 can include a water intake 12 and one or more modules. Each of the modules is sized and shaped for a point-of-use (POU) application (such as mounted on common household taps and/or in a countertop and/or under-counter appliance), for a point-of-entry (POE) application (such as a household POE and commercial POE), and/or for a commercial facility application (e.g., restaurants, bottling facilities, etc.) alone or with at least one other module. In some embodiments, each of the modules can interface with standard household taps, and is short enough in the vertical dimension to fit within a common household sink with room beneath it for placing hands or a glass. In some other embodiments, each of the modules can be sized and shaped for use in a countertop appliance (e.g., for household, cafeteria kitchen, restaurant kitchen use, etc.). In some other embodiments, the system 10 can interface with water fountains, water refilling stations, water bottling machines and/or any potable water dispensing devices. For example, in the embodiment shown in FIG. 1, the system 10 includes a UV module 14, an adsorption module 16, and a filtration module 18. The different modules of the system 10 can oxidize, disinfect, destroy, deactivate, denature, adsorb, filter and/or otherwise purify water of one or more of various contaminants found in water, such as pathogens (e.g., bacteria and viruses), compounds of emerging concern (e.g., pharmaceuticals, hormones, pesticides and trace organics), chlorine and heavy metals, among others.

The UV module 14 can include one or more UV light sources 15, such as, for example, one or more UV-light emitting diodes (LEDs). UV light emitted from the light sources 15 can advantageously activate residual chlorine in the flow path to create powerful hypochlorous acid radicals that can oxidize contaminants. The hypochlorous acid radicals can destroy and/or inactivate a variety of contaminants, including compounds of emerging concern (e.g., endocrine disrupter compounds, pharmaceuticals, pesticides, hormones, and/or trace organics), bacteria and viruses, among others. The UV module 14 can emit UV light into the flow path at a variety of wavelengths. For example, in some embodiments, the one or more UV light sources 15 can emit light having a wavelength distribution centered in the UVA or UVB spectrums, such as in the range of 270 nm to 425 nm. In an example of UVB light source(s) 15, the wavelength distribution can be centered in a range of about 270 nm to 290 nm, e.g., 280 nm±5 nm. In another example, UVA light source(s) 15 can have a wavelength distribution centered in the range of about 310 nm to 410 nm, e.g., 405 nm±5 nm. It should be appreciated that the one or more UV light sources 15 may have manufacturing tolerances associated with their target wavelengths. For example, an LED with a 280 nm target or nominal wavelength may have a tolerance of +/−3 nm and/or +/−2% such that the actual wavelength distribution emitted by the LED may be centered at a wavelength slightly different from 280 nm (e.g., 277 nm, 278 nm, or 282 nm), and of course typical light sources will include a distribution of wavelengths on either side of the center wavelength. The selection of the one or more UV light sources 15 can be based on the cost and/or the performance. For example, the performance of UVA LEDs can have a different effectiveness from UVB LEDs in activating or catalyzing oxidants, such as residual chlorine. Also, UV LEDs with the UVA spectrum may be available at a reduced cost compared to UVB LEDs, such that for a given acceptable cost, more LEDs and thus more light intensity can be provided. It should be understood and appreciated that the options available for the wavelengths here can be broad because, unlike the traditional UV disinfection, which relies on directly breaking down pathogens or other organic material by UV exposure, embodiments herein teach UV light to activate or catalyze oxidants. In some embodiments, the oxidation system 14 can include one, two, three, or more UV light sources 15. In some embodiments, each of the UV light sources 15 can emit light having different wavelengths and intensities. In some embodiments, the one or more UV light sources 15 can be replaced. The UV module 14 can include a replaceable and/or rechargeable battery 13 to power the one or more UV light sources 15. In some embodiments, the battery 13 can have a life of approximately 60 days (depending on use). In some embodiments, the system 10 and/or the UV module 14 can be plugged into a docking station to recharge. In some other embodiments, the UV module 14 can be powered directly from the docking station. In still other embodiments, the system 10 can be directly connected to a household power supply and include suitable power converters. Desirably, the UV light source 15 is separated from flowing water through the module by a UV-transparent window.

The adsorption module 16 can include adsorption media 17. The adsorption media 17 can react with contaminants and remove them from the flow path. For example, in some embodiments, the adsorption media 17 can include activated carbon (C) and/or zeolites or silicon dioxide ($SiO_2$). The activated carbon can be powder activated carbon (PAC), solid block activated carbon, and/or granular activated carbon (GAC). The $SiO_2$ can be granular $SiO_2$ particles. In some embodiments, the adsorption media 17 can be a mixed bed of PAC and zeolites or $SiO_2$, although it should be appreciated that the adsorption media 17 can comprise other suitable material. Components of the adsorption media 17 (e.g., activated carbon) can adsorb residual chlorine in the flow path. For example, as shown in FIG. 1, the adsorption media 17 can adsorb residual free chlorine that passes through the UV module 14.

In some embodiments, the adsorption module 16 is replaceable. For example, the adsorption module 16 can be periodically replaced as needed (depending on use). Users may either directly purchase replacements or opt in to a subscription service that sends replacements periodically or as needed (e.g., every 3 months or whenever the system 10 indicates a new replacement needs to be mailed). The system 10 can determine when a replacement is needed in a variety of ways, such as, for example, measuring the total flow through the adsorption module 16 or by sensing contaminant buildup, among others. In one embodiment, the adsorption module 16 includes an indicator 24 (see FIG. 3A) to the user for when the adsorption module 16 is close to the replacement being due (e.g., at a selected level within 50% of its average useful lifespan) and when it is due for replacement (e.g., at 80% of its average useful lifespan). The indicator 24 can be based upon timing or upon sensor readings. The indicator 24 to the user can be different color LED outputs, e.g. blue for normal operation; yellow for a warning when it is close to replacement, and red for a warning when replacement is due. In another embodiment, the indicator 24 to the user can be a displayed percentage of remaining life in the module. In another embodiment, the indicator 24 to the user can be a sound emitted from a speaker.

The filtration module 18 can include an ultrafiltration, microfiltration, and/or reverse osmosis membrane filtration unit. The embodiment shown in FIG. 1 shows the filtration module 18 arranged downstream of the UV light module 14 and the adsorption module 18. In some embodiments, a coarse cartridge filter can be employed for the removal of large particulate matter, but not for the removal of other contaminants such as residual chlorine (see FIG. 5A and attendant description). The filtration module 18 can remove contaminants from the flow path, such as, for example, organics, microorganisms (e.g., bacteria), and heavy metals (e.g., selenium, arsenic, among others). In some embodiments, the filtration module 18 can be replaceable and may include indication means to alert the user of remaining life in the module, similar to that described above for the adsorption module 16.

As noted above and shown in FIG. 1, the system 10 can also include a water intake 12 and an aerator 20. In some embodiments, the water intake 12 can hydraulically connect the module(s) of the system 10 to the end of a tap or faucet. In some other embodiments, the water intake 12 can fluidly connect the module(s) of the system 10 to a tank. For example, a first end of the water intake 12 can removably attach to a tap or a hose that is connected to a tank and a second end of the water intake 12 can removably attach to one of the modules (e.g., the UV module 14, the adsorption module 16, or the filtration module 18). In some embodiments, the water intake 12 can include, for example, a male connector (e.g., external threading) that can couple to a female connector (e.g., internal threading) of a standard faucet. In some embodiments, the water intake 12 can split or redirect a flow of water into one or more portions of a module, such as, for example, a periphery of a module and/or a center of a module. For example, the water intake 12 can direct flow toward the periphery to an annular channel in the UV module 14 and away from a sealed central tube housing the UV light source 15. In other embodiments, the upstream ends of the modules can be removably attached to the tap or the feed tank directly without the use of the water intake 12. In some embodiments, the water intake 12 can act as a valve so as to prevent, for example, a backward flow of water. In some embodiments, the water intake 12 can be modularly employed with any of the modules. FIG. 3D, for example, illustrates use of the water intake 12 in the form of a flow splitter cap and faucet attachment that can be employed with the adsorption module 16 without the intervening UV module 14.

As shown in FIG. 1, the aerator 20 can be attached to the last module in the system 10 (e.g., the UV module 14, the adsorption module 16, or the filtration module 18). For example, FIG. 1 shows the aerator 20 connected to a bottom of the filtration module 18. The aerator 20 can be any suitable aerator, such as, for example, a venturi aerator, and can be integrated with any of the modules described herein. The aerator 20 can create turbulence in the flow path. In various embodiments, the water intake 12, the UV module 14, the adsorption module 16, the filtration module 18, and the aerator 20 can be screwed or snapped together in any suitable arrangement. In some embodiments, the water intake 12 can be integrated with an upstream end of a module, and/or the aerator 20 can be integrated with a downstream end of a module.

The size of the system 10 can vary depending upon the application. For example, tap-mounted embodiments as illustrated in FIGS. 3A-4B can be compact, such as, for example, 2 inches to 5 inches long including the modules and components illustrated in FIG. 1. Other dimensions are also contemplated. For example, countertop and undercounter embodiments (see FIGS. 5A-5B and attendant description) may be larger than tap-mounted embodiments, and higher volume applications, such as point-of-entry (POE) and commercial bottling applications, can be larger still.

In some embodiments, the system 10 can include a monitoring system (also referred to as a remote sensing system) that can monitor the performance of the system 10 (e.g., amount of contaminants removed, water temperature, water consumption, remaining life of the adsorption module, and the like) and any other data associated with the use of the system 10. In some embodiments, the system 10 can include various sensors, such as a UV sensor, a thermometer, and a proximity sensor for monitoring. In some embodiments, the monitoring system can automatically notify users that replaceable elements (e.g., the UV light sources 15, the battery 13, adsorption module 16, etc.) need to be replaced. The monitoring system can include one or more temperature sensors, flow meters, pressure sensors, and the like. The monitoring system can monitor critical parameters that affect water quality, safety, and water conservation. The monitoring system can display monitored parameters on a display 22, such as the display 22 showing a temperature readout in FIG. 3A on the UV module 14 or the display 22 of the countertop module in FIG. 5B for both display and input in the form of a touch pad. Similar displays can be provided on other modules or on the overall system housing. In some embodiments, the monitored parameters can be displayed instead on a smartphone or central household monitoring system in wireless communication with the monitoring system. Either a display 22 on one of the modules or the display on a smartphone or other personal electronic device can display one or more of the measured parameters (e.g., when a threshold is reached). For example, in some embodiments, the smartphone can include an app that has an automatic "pop-up" display when one of the following parameters is triggered: water temperature, water consumption, and/or the remaining life of the adsorption module.

The quality of tap water in different regions can vary. The modular nature of the system 10 can advantageously allow users different plug and play options so they can choose the modules that are best for treating locally available water. For example, the UV module 14 can include different numbers of LEDs for different regions, the adsorption module 16 can include different materials and amounts of materials for different regions, and the filtration module 18 can be configured to filter different contaminants in different regions. Moreover, the modularity of the system 10 allows the user to use one or more modules in different combinations: the UV module 14 alone; the adsorption module 16 alone; the filtration module 18 alone; the combination of the UV module 14 and downstream adsorption module 16; the combination of the UV module 14 and downstream filtration module 18; the combination of the adsorption module 16 and downstream filtration module 18; and the combination of all three modules, with the UV module 14 upstream of the adsorption module 16 which is upstream of the filtration module 18.

Figures 2A, 2B:
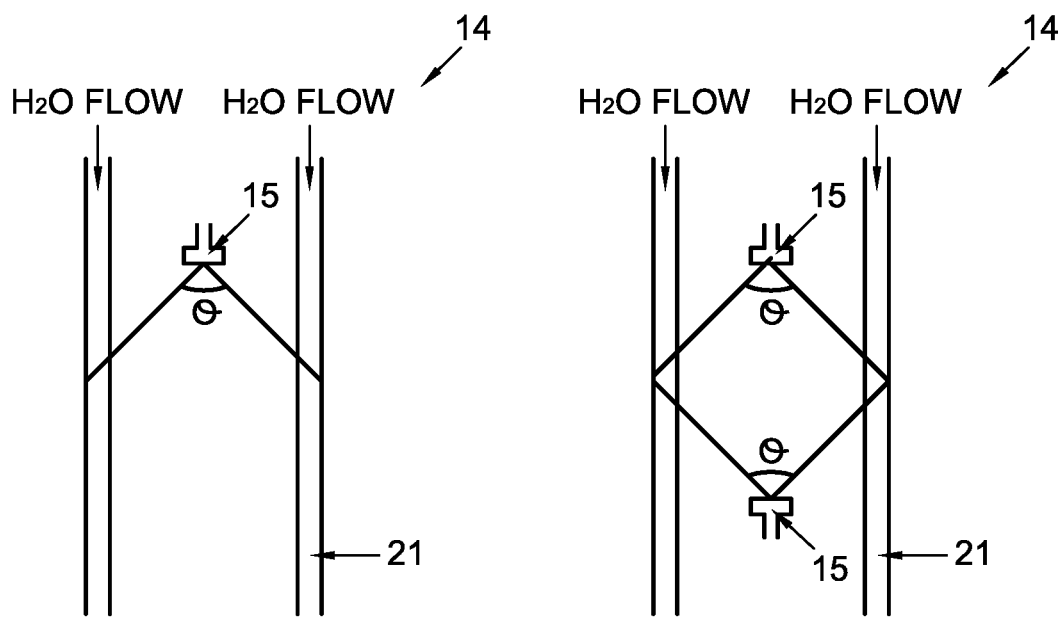
FIG. 2A is a cross-section of a UV module with one UV light source, in accordance with one embodiment.
FIG. 2B is a cross-section of a UV module with two UV light sources, in accordance with another embodiment.

FIG. 2A is a cross-section of the UV module 14 configured with one UV light source 15 and FIG. 2B is a cross-section of the UV module 14 configured with two UV light sources 15. As shown in FIGS. 2A and 2B, water can flow around the UV light sources 15 in a peripheral channel. In some embodiments, the flow path 21 around the UV light sources 15 can be an annular channel and/or a spiral channel. The UV light sources 15 can emit light in an arc θ. For example, in some embodiments, the arc θ can range from about 115 degrees to about 140 degrees, such as, for example, about 120 degrees. FIG. 2B shows that the arcs θ of multiple UV light sources 15 can overlap, which can advantageously increase the UV intensity in the flow path 21 (e.g., double wattage or more) and thus increase the UV dose for a given flow rate. The UV light sources 15 can face in any suitable direction. For example, the UV light source 15 in FIG. 2A is facing downward and the upper and lower UV light sources 15 in FIG. 2B are facing downward and upward, respectively. In other arrangements, three or more UV light sources can be arrayed to face radially outward toward the peripheral (for example, annular) channel. In some embodiments, the flow of water may be controlled by shape of the flow path 21 and/or water feed mechanism, which can, in turn, control the UV dosage.

Figure 3A:
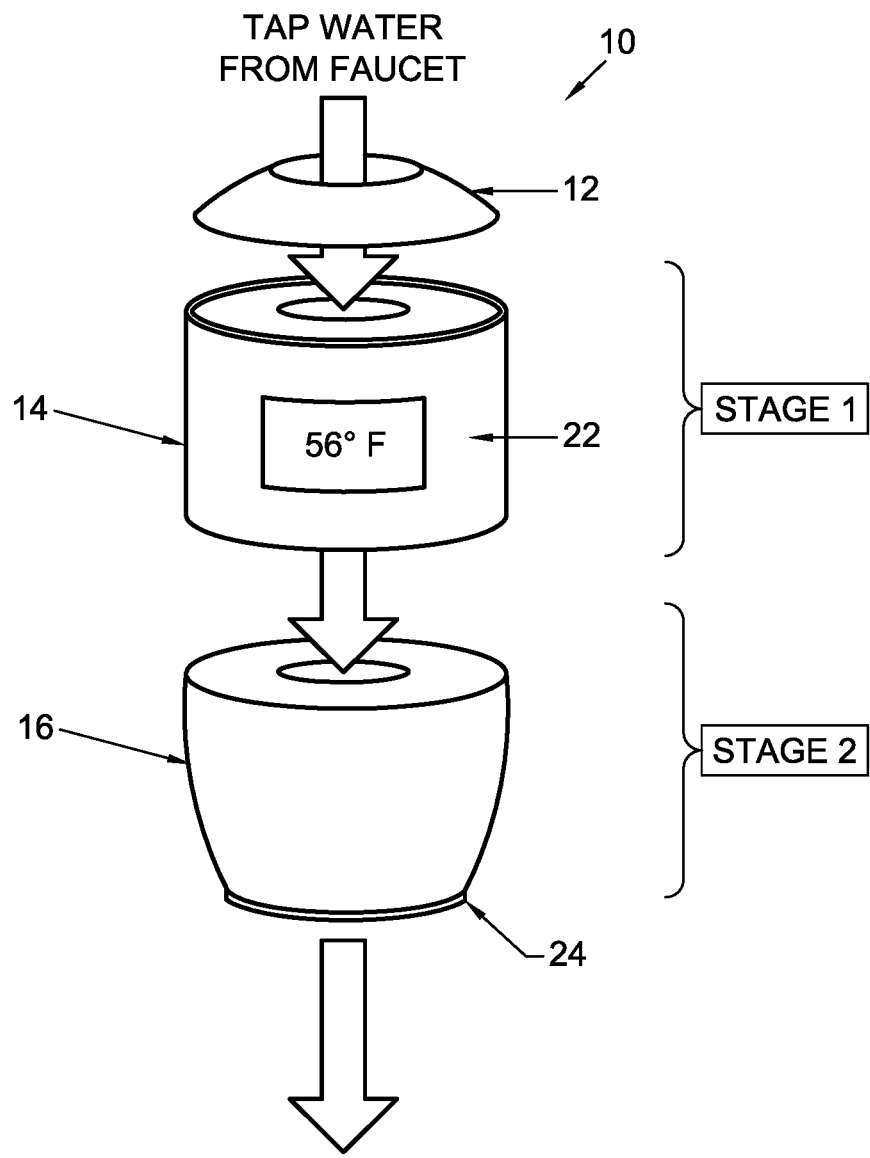
FIG. 3A is an exploded perspective view of a modular water treatment system configured for mounting on a tap, having a UV module upstream of an adsorption module, according to some embodiments.
Figure 3B:
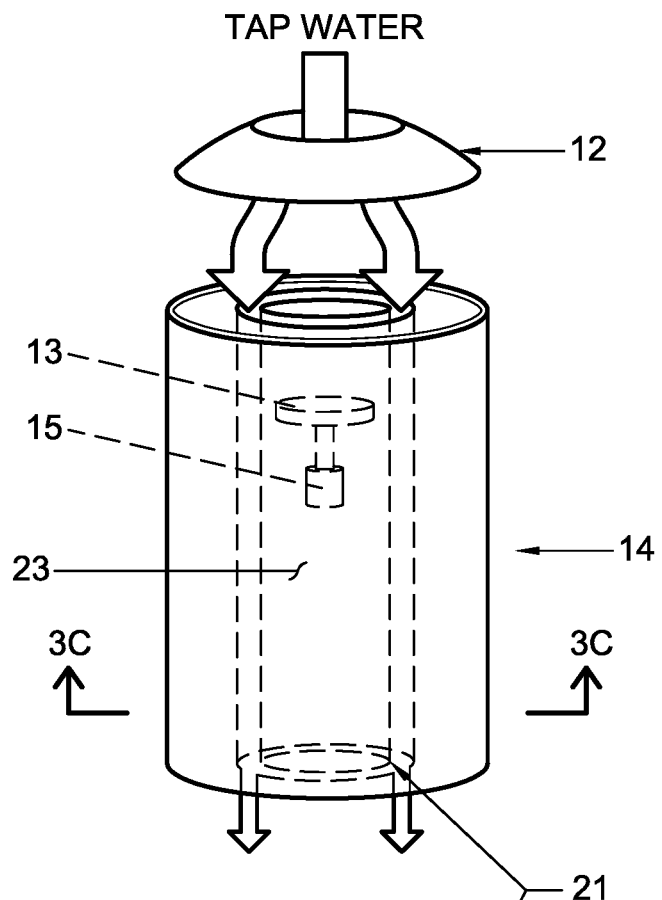
FIG. 3B is a perspective view of the UV module of FIG. 3A.
Figure 3C:
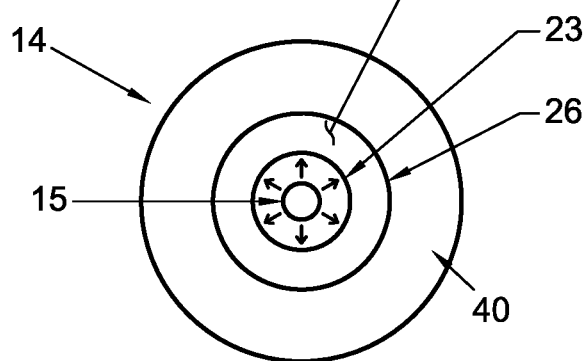
FIG. 3C is a cross-section of the UV module of FIG. 3B.
Figure 3D:
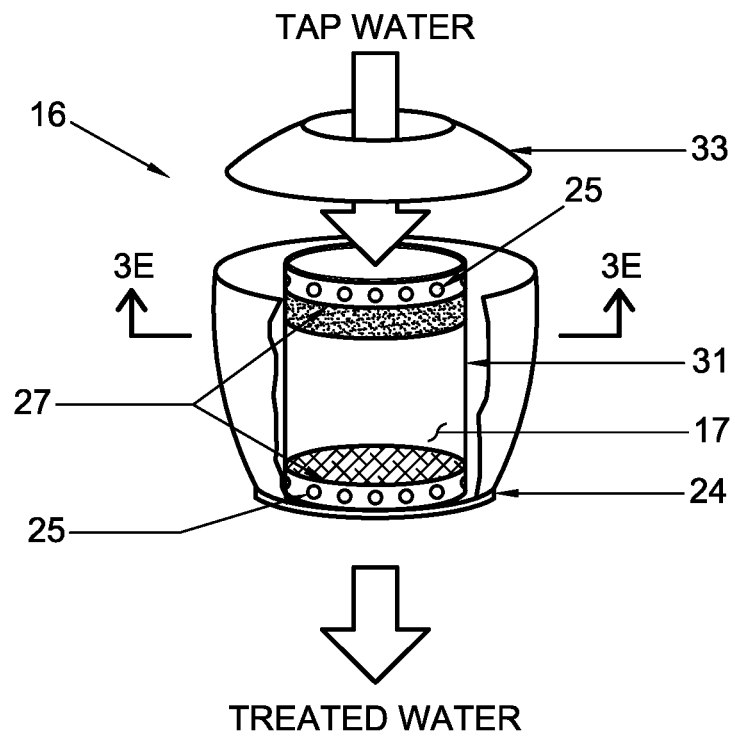
FIG. 3D is a perspective view of the adsorption module of FIG. 3A (with some components shown transparent for purposes of illustration).
Figure 3E:
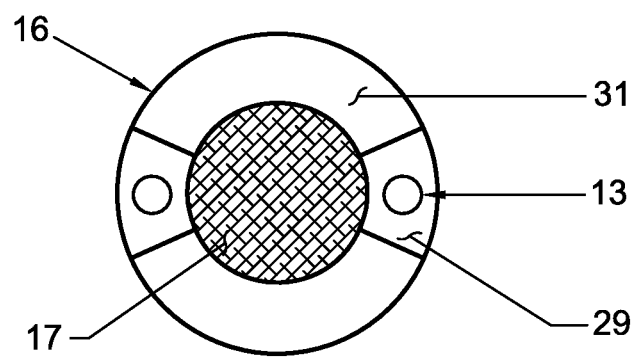
FIG. 3E is a cross-section of the adsorption module of FIG. 3D.

FIGS. 3A-3E are various views of a modular water treatment system 10 configured for tap mounting, according to some embodiments. FIG. 3A is an exploded perspective view of a system 10 having a UV module 14 upstream of an adsorption module 16. FIG. 3B is a perspective view of the UV module 14 of FIG. 3A FIG. 3C is a cross-section of the UV module 14 of FIG. 3B. FIG. 3D is a perspective view of the adsorption module 16 of FIG. 3A (with some components shown transparent for purposes of illustration). FIG. 3E is a cross-section of the adsorption module 16 of FIG. 3D. Unless otherwise noted, reference numerals in FIGS. 3A-3E refer to components that are the same as or generally similar to the components of FIGS. 1-2B.

As shown in FIG. 3A, the system 10 can include water intake 12 in the form of a flow splitter cap and faucet attachment, configured to attach at an upstream end to a standard household tap, and at a downstream end to one of the modules (shown attached to the UV module 14). The illustrated system 10 also includes a display 22 and an indicator light 24. The display 22 can display one or more parameters of the system 10 as described above and is illustrated as being on the UV module 14 and showing a water temperature, but it will be understood that a display can be on other modules and indicate other operational parameters. The indicator light 24 can indicate various operational statuses of the system 10 and is illustrated as being an annular ring at the downstream end of the adsorption module 16, but it will be understood that indicator lights can be provided on other modules. For example, in some embodiments, the indicator light 24 can illuminate in a solid color to indicate that the system 10 is functioning properly (e.g., solid blue), is close to being due for replacement (e.g., solid yellow) or is due for replacement (e.g., solid red). In some embodiments, the indicator light 24 can flash if the battery 13 is low or if the adsorption module 16 needs to be replaced. In some embodiments, the display 22 can be used for these indicator functions.

Various other features are shown in FIGS. 3B-3E. For example, in FIGS. 3B and 3C, an inner surface 26 of the outer annulus 40 can have a shiny surface (e.g., a reflective stainless steel surface) to reflect light back into the flow path 21 after having passed through the flow path 21, such that any unabsorbed UV light in the reflections may further irradiate the flowing water. In the embodiment illustrated in FIGS. 3B and 3C, the UV light source 15 is separated from the flow path 21 by a UV transparent wall 23.

As another example, in FIGS. 3D and 3E, the adsorption module 16 is shown as having a bypass mode. The bypass mode can advantageously increase the flow of water through the system 10 by bypassing the adsorption media 17. The bypass mode may be useful, for example, whenever the tap is being used but the water does not need to be filtered, such as when washing dishes or shaving, or when running the water to attain a desired temperature before use. This can beneficially prolong the life of the adsorption media 17. In some embodiments, the bypass mode can be activated by rotating an outer shell having one or more holes relative to an inner shell having one or more corresponding holes 25. In some embodiments, a rotation ring 27 can be implemented to help rotate the outer shell. As shown in FIG. 3D, the holes 25 can be circumferentially spaced and extend around a top and bottom portion of the adsorption module 16 and can lead to a peripheral by-pass flow path 31 shown in FIGS. 3D and 3E. The periphery may also include a battery compartment 29 separated from the by-pass flow path 31, for housing batteries 13 to power the indicator light 24.

In some embodiments, such as the embodiment shown in FIG. 3D, a water distribution module 33 can be employed upstream of the adsorption module 16. In some embodiments, the water distribution module 33 can have the same structure as the water intake 12. As described above, the water intake 12 can be configured to attach to a standard tap and direct spread water into the desired flow path through module that is attached downstream. Accordingly, the water intake 12 can be modularly employed with each of the modules of FIG. 1 in the illustrated tap-mounted embodiment of FIGS. 3A-3E. In some embodiments, the water distribution module 33 can have a different structure from the water intake 12. In such embodiments, the water distribution module 33 can receive water directly from the tap or from any of the modules (e.g., the UV module 14) and direct water into the desired flow path through module that is attached downstream. For example, the outlet of the water distribution module 33 may be different from the water intake 12 in view of differences in the flow paths for the UV module 14 (peripheral main flow path) vs. the adsorption module 16.

Figure 4A:
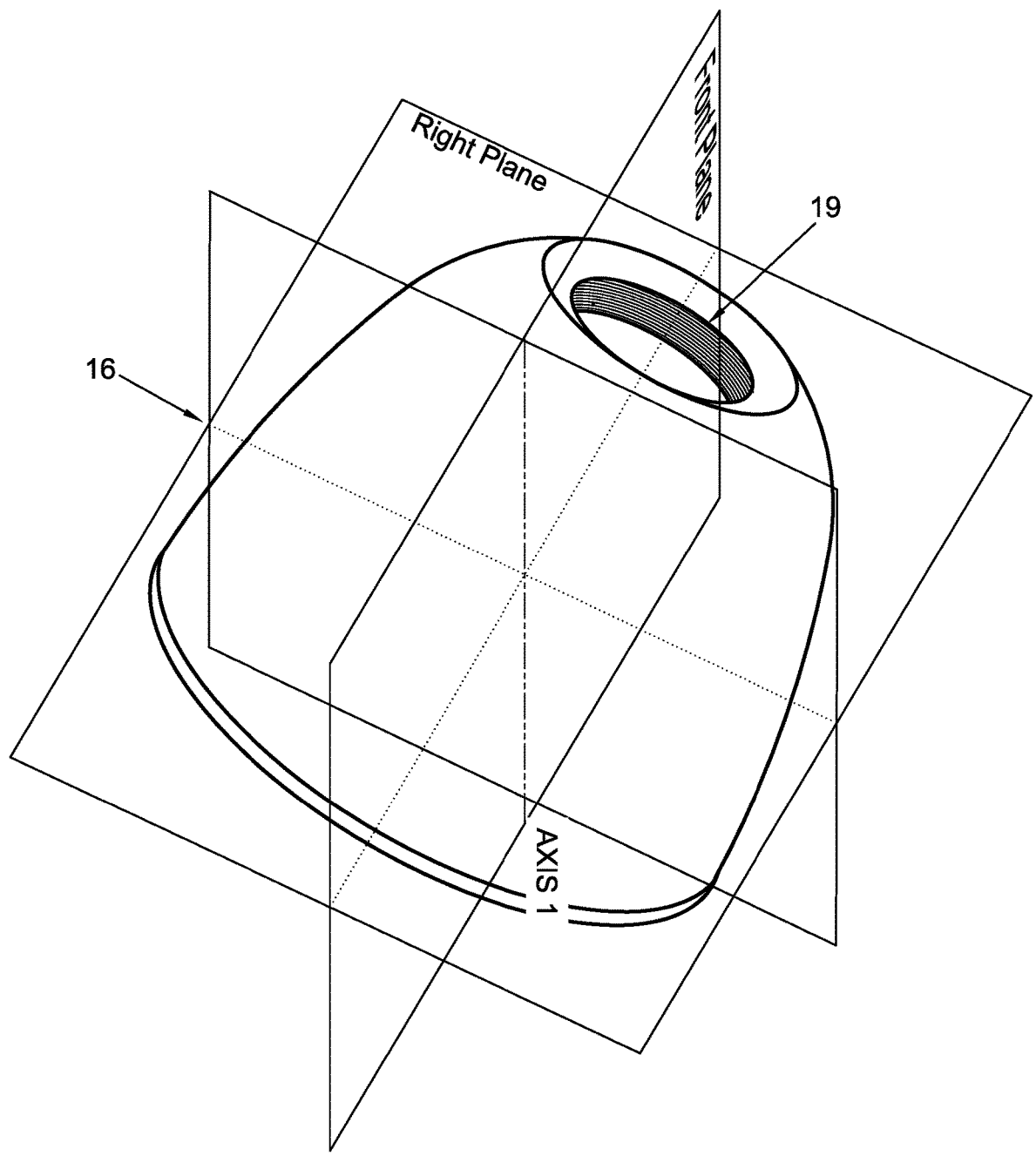
FIG. 4A is a top perspective view of an adsorption module, according to some embodiments.
Figure 4B:
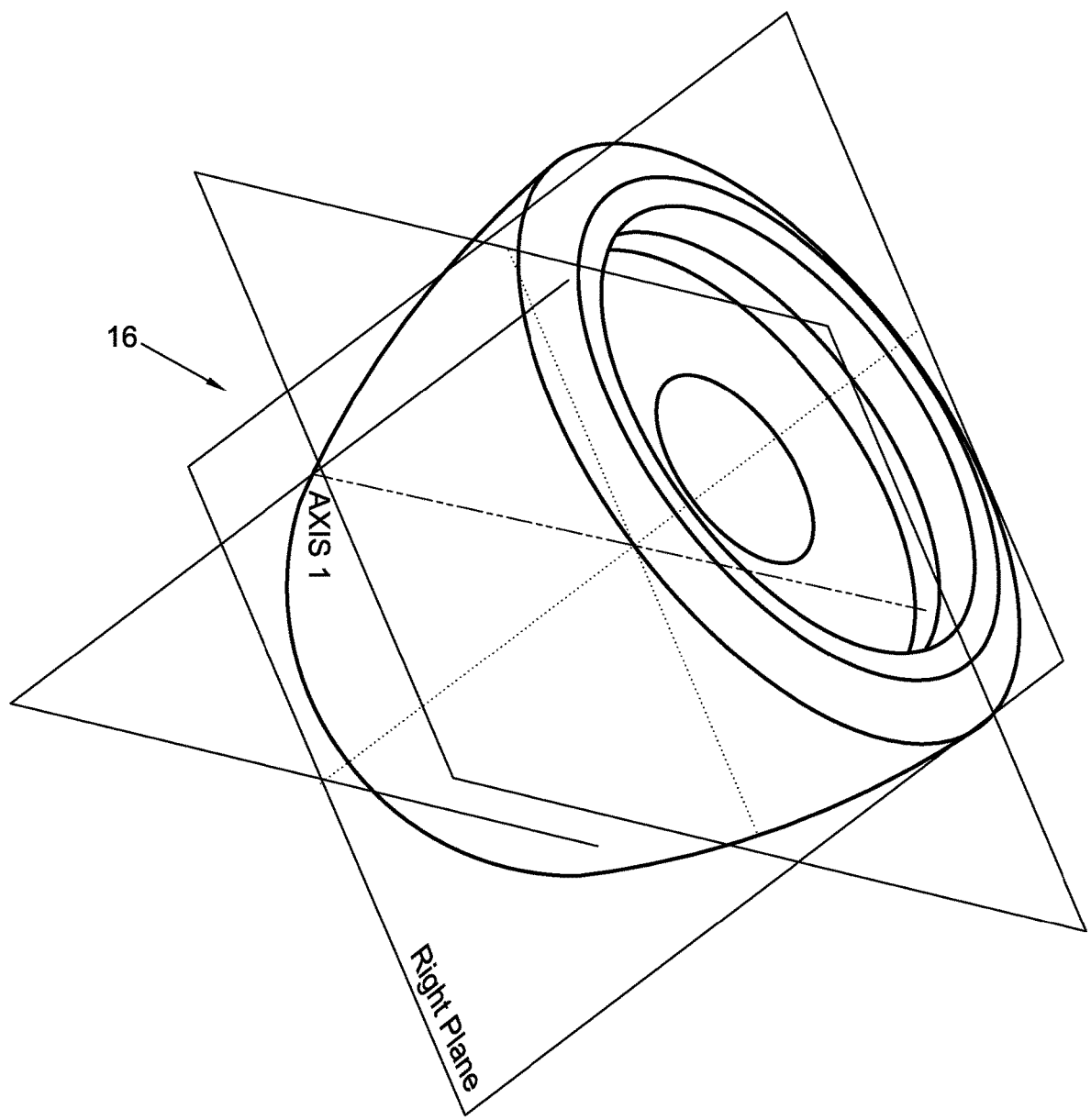
FIG. 4B is a bottom perspective view of the adsorption module of FIG. 4A.

FIGS. 4A and 4B are top and bottom perspective views of the adsorption module 16, according to some embodiments. As can be seen, the downstream end of the module includes an internally threaded interface 19, which can be similar to that of a standard tap and can receive further downstream modules, such as a filtration module 18 and/or aerator 20, as described with respect to FIG. 1.

It will be understood that the tap-mountable system 10 of FIGS. 3A-3B can be adapted for use independent from a tap, faucet, POE or commercial (e.g., water bottling) facility application. For example, a user may hold the system 10 in a portable water container and manually feed water into the system 10. In some embodiments, for example, the system 10 can include the water intake 12 positioned upstream of any other modules, a UV module 14, a adsorption module 16, a filtration module 18, and an adaptor attached to the last module in the system 10, whereby the adaptor having a female connector that may be connected to a water bottle, or designed integral to the water bottle. In such embodiments, the user can feed water through the water intake 12 and let the water flow in the system 10 by gravitational potential energy dispensing the water through the adaptor. Such embodiments for portable water containers can be advantageous, for example when traveling.

Figure 5A:
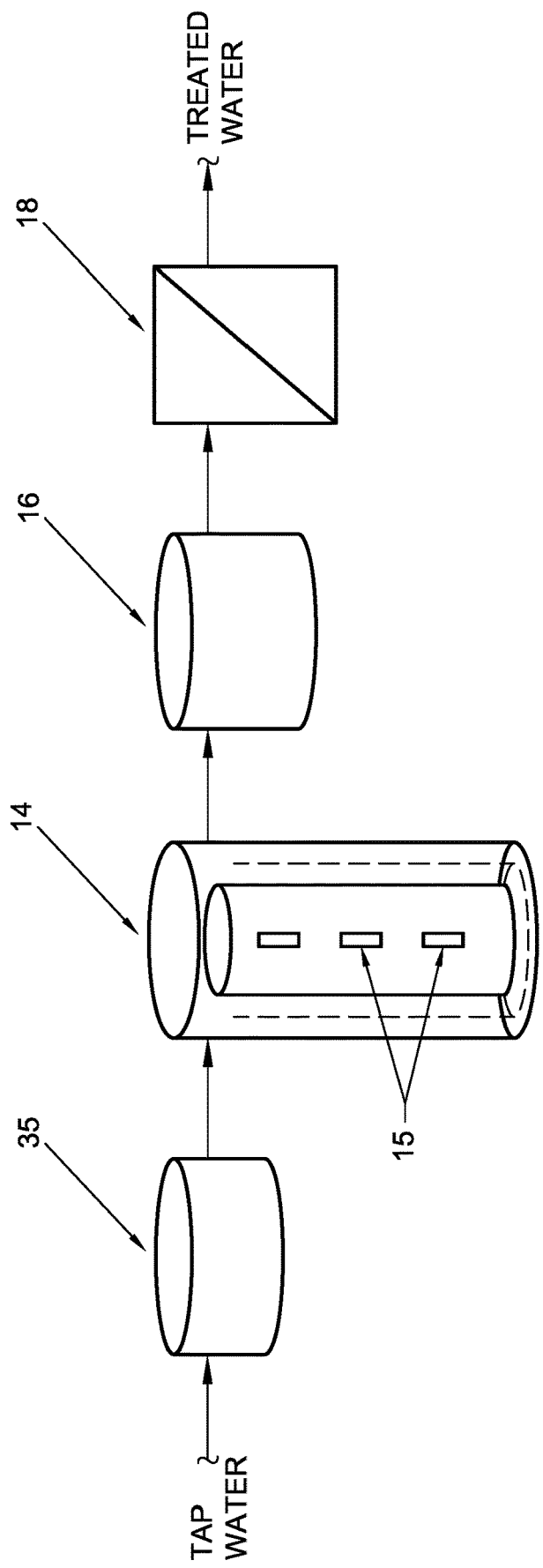
FIG. 5A is a schematic view of stages of a modular water treatment system for a countertop appliance, according to some embodiments.

FIG. 5A is a schematic view of a modular countertop water treatment system 10 according to some embodiments. As shown in FIG. 5A, the system 10 includes a particulate filter module 35, a UV module 14, an adsorption module 16 and a filtration module 18. The functions of the UV module 14, the adsorption module 16, and a filtration module 18 can be generally similar to the corresponding modules described above.

There are two filtration modules, the particulate filter module 35 and the filtration module 18, shown in FIG. 5A. The particulate filter module 35, as shown in FIG. 5A, is positioned in the flow path upstream of the UV module 14, and the filtration module 18. The filtration module 18 is positioned in the flow path downstream of the adsorption module 16. The two different types of filters (the particulate filter module 35 and the filtration module 18) can be configured to filter different contaminants if desired. For example, the particulate filter module 35, which may be a cartridge-type module for ready replacement, positioned upstream of the UV module 14 can be a 5 to 40 micron particulate filter and the filtration module 18 positioned downstream can be an ultrafiltration filter or a reverse osmosis filter. In some circumstances, the particulate filter module 35 positioned upstream of the UV module 14 can filter course particulate matter to increase the transmissivity of water reaching the UV module 14, and help the UV light emitted from the UV light source 15 to penetrate through the water effectively.

The UV module 14 as shown in FIG. 5A has three UV light sources 15. As explained above, the UV module 14 can have any number of the one or more UV light sources 15. The three UV light sources 15 depicted here are positioned vertically and evenly spaced. However, the arrangement of the UV light sources can be different to best activate residual chlorine in the flow path.

Figure 5B:
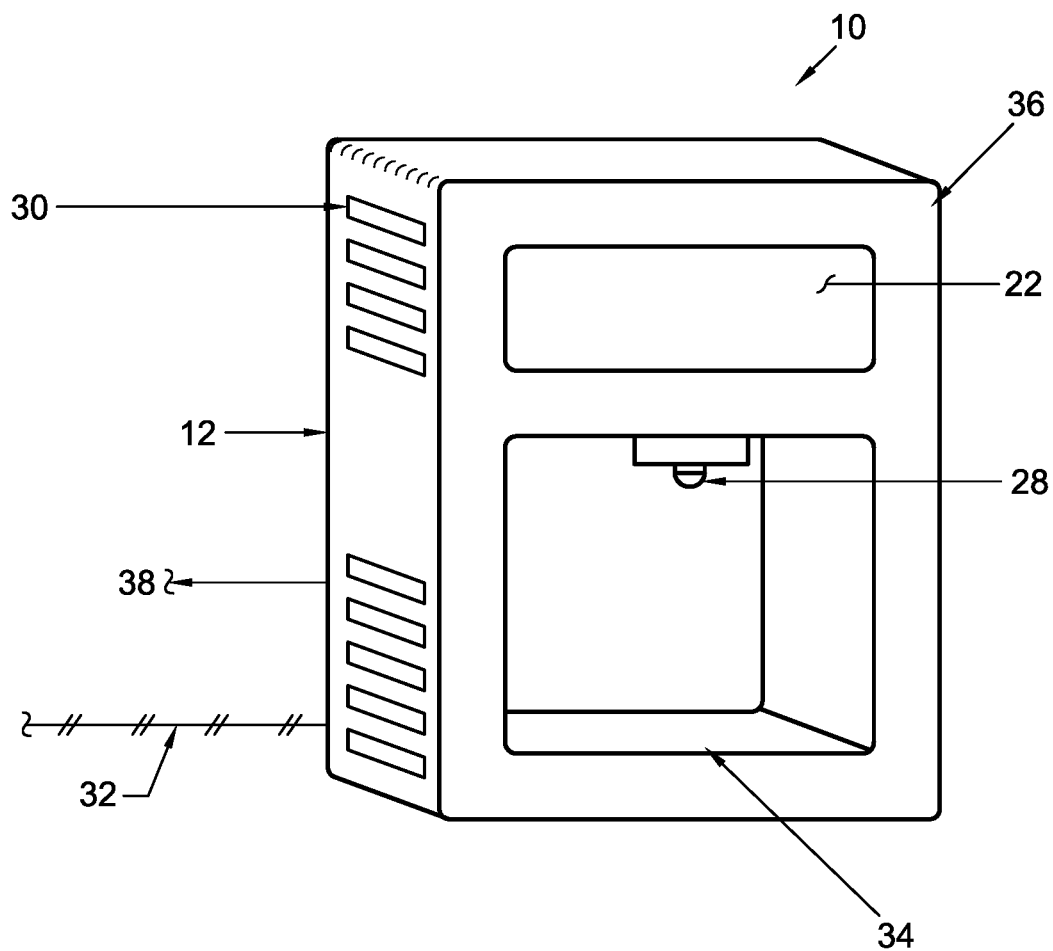
FIG. 5B is a schematic front and left perspective view of a modular countertop design appliance for water treatment, according to some embodiments.

FIG. 5B is a schematic front, left and top perspective view of the countertop water treatment system 10 of FIG. 5A, according to some embodiments. The countertop design of the system 10 can include a housing 36 that can be configured to be integrated with (for example, enclose) the UV module 14, the adsorption module 16 and other modules associated with the system 10. The housing 36 can be made of stainless steel, aluminum, plastic, or any other material suitable. In some embodiments, the housing can be entirely or partially surrounded by a thin film display, whereby the user may choose the color and design suitable for the used environment. In some embodiments, the housing 36 can be coated with an antimicrobial and/or deodorant finishing. In some embodiments, the housing 36 can have an uneven surface or braille to assist people with visual impairments to locate certain function keys.

As noted above with respect to the embodiment of FIG. 3A, the display 22 can show the one or more of the measured parameters of the system 10 collected from the monitoring system. In some embodiments, the display 22 can also serve as an input device, such as a touch pad for the user to selectively display options for viewing the various measured parameters, such as water temperature, remaining life in time or treatable fluid volumes for the various modules, etc. In some embodiments, the user can set the amount of water to be dispensed by controlling the system 10 by touching the display 22. In some embodiments, the system 10 can include a LAN connector and/or a Wi-Fi receiver to be connected to the Internet and place replacement orders via the Internet based on the measured parameters and/or user commands.

In some embodiments, the housing 36 can include heat dissipation vents 30. The heat dissipation vents 30 dissipate heat generated in the system 10 to prevent the system 10 from overheating.

In some embodiments, the system 10 can include a dispensing tap 28 integrated with the housing in fluid communication with the last module in the system 10 in the flow path, such as the downstream filter module 18 of FIG. 5A, or an aerator 20 (see FIG. 1). The dispensing tap 28 can dispense water as a controlled rate when activated, or can be adjustable to control a rate of flow. In some embodiments, the dispensing tap can be connected to a hose, allowing the user to dispense water to a place remote from the system 10. As will be understood by the skilled artisan, one or more of the treatment modules can be integrated with the dispensing tap 28 outside of the housing 36.

As shown in FIG. 5B the system 10 can further include a power cord 32. The power cord 32 can be plugged into a standard household electric outlet. In some embodiments, the power from the power cord 32 can, for example, recharge a rechargeable battery 13 associated with the UV light module 14, or can include a suitable power converter circuitry to directly power the UV light module 14 and/or any other module(s) in the system 10. The system 10 can also include a pump and motorized star valve or other flow regulation system to ensure a suitable flow rate through the system to ensure sufficient UV dosage for activation of residual chlorine and disinfection of EDC's and other compounds of emerging interest.

As shown in FIG. 5B the system 10 can further include a water receptacle platform 34. The user can place a cup, a bottle, a pot or any other liquid containers on the water receptacle platform 34 to receive the water dispensed from the dispensing tap 28. In some embodiments, the water receptacle platform 34 can further include a drain to catch any overflow. In some embodiments, the system 10 can include an object sensor near the water receptacle platform 34 for detecting the presence of the cup to allow an auto dispensing function for a present volume of treated water and/or to detect overflow and trigger an auto stop function.

In some embodiments, the water intake 12 of the system 10 in the countertop design may be connected to a tap or to a splitter on plumbing below a sink via a hose. In some other embodiments, the water intake 12 can include a reservoir whereby the user can feed water manually to the system 10, similar to many coffee makers.

In some embodiments, whether directly plumbed or manually filled, the system 10 can include a water tank positioned upstream of the UV module 14. The water tank can hold water temporarily until the user instructs the system 10 to operate. In some embodiments, the system 10 can include heating and/or cooling systems to dispense water with a user selected temperature, selected, for example, on the display 22.

As noted above, the system 10 can further include a water pump that pumps water through the flow path from, for example, the water pipe and/or the water tank. In some embodiments, the water pump can be adapted to regulate flow to ensure an adequate UV dosage to activate residual chlorine.

In some embodiments, the system 10 can further include a transmitter that can transmit the preference of the system 10 and the data associated with the system 10 to a data collection center. The data collection center can be operated, for example, by a manufacturer of the system 10 and/or a data analyzing firm to improve the system 10. The data collection center can assist the users with purchasing replacements for the system 10. The data collection center can also assist a user with building the system 10 with a preferred combination of the module(s) for the particular user. The data collection center can also allow for users to give their health information to the data collection center for analyzing the health of the users and give certain recommendations.

In some embodiments, the system 10 can include a voice recognition system, whereby the user can operate various functions of the system 10 by voice commands.

In some embodiments, the system 10 can include a filtrate return 38. The filtrate return 38 can allow for a discharge of membrane reject, and/or concentrate water from the particulate filter module 35 and/or membrane filtration module 18.

Any system, method, and device described in this application can include any combination of the preceding features described in this and other paragraphs, among other features and combinations described herein, including features and combinations described in subsequent paragraphs.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow. Moreover, language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A potable liquid treatment system comprising:
   at least one ultraviolet (UV) light source configured to emit UV light into potable liquid flowing in an annular portion of a flow path to activate residual chlorine in the potable liquid; and
   an adsorption medium positioned in the flow path downstream of the at least one UV light source, the adsorption medium being configured to adsorb any remaining free chlorine from the potable liquid,
   wherein the system is configured such that UV treatment in the system consists of emission of the UV light into the potable liquid in the annular portion of the flow path upstream of the adsorption medium by the at least one UV light source, and
   wherein the annular portion of the flow path is defined at least partially by and positioned between two tubular walls including a UV transparent wall.

2. The system of claim 1, wherein the UV light has a wavelength distribution centered in the range of about 270 nm to 425 nm.

3. The system of claim 1, wherein the adsorption medium comprises powder activated carbon, solid block or granular activated carbon.

4. The system of claim 1, further comprising a particulate filter positioned upstream of the at least one UV light source.

5. The system of claim 1, wherein an inlet for the system is configured to connect the system to a tap or a splitter on plumbing below a sink via a hose.

6. The system of claim 1, wherein the at least one UV light source comprises a first UV light source and a second UV light source that face each other.

7. The system of claim 1, configured to be positioned at a household point of entry from a chlorinated public water supply.

8. A water treatment system comprising:
   an ultraviolet (UV) module having a UV light source, the UV light source configured to emit UV light into a first portion of a flow path to activate residual chlorine; and
   an adsorption module coupled to the UV module and positioned in a second portion of the flow path downstream of the first portion,
   wherein the UV light has a wavelength distribution centered in the range of about 270 nm to 290 nm,
   wherein the system is configured such that UV treatment in the system consists of emission of the UV light into the first portion of the flow path upstream of the second portion by the UV treatment module, and
   wherein the first portion of the flow path comprises an annular flow path defined at least partially by and positioned between two tubular walls.

9. The system of claim 8, wherein the UV module emits light has a wavelength distribution centered in the range of about 275 nm to 285 nm.

10. The system of claim 8, wherein the adsorption module comprises a bed of at least one of powder activated carbon, granular activated carbon, solid block carbon, zeolites, and silicon dioxide media.

11. The system of claim 8, wherein the two tubular walls comprise a UV transparent wall, the UV light source and the flow path are separated by the UV transparent wall that is disposed around the UV light source, and the flow path surrounds the UV transparent wall.

12. The system of claim 8, configured to be sized and shaped for an under-counter water treatment appliance.

13. The system of claim 8, configured as a household point-of-entry (POE) flow-through potable water treatment system that is configured to be positioned at a POE from a public water supply.

14. A point-of-entry (POE) flow-through potable water treatment system comprising:
   an ultraviolet (UV) treatment module configured to be positioned at a building's POE from a chlorinated public water supply, the UV treatment module having a UV light source configured to emit UV light into potable water flowing in a first portion of a flow path to activate residual chlorine in the potable water, the first portion of the flow path having an annular or spiral shape; and
   an adsorption module having an adsorption medium positioned in a second portion of the flow path downstream of the first portion of the flow path, the adsorption medium being configured to adsorb any remaining free chlorine from the potable water;
   wherein the system is configured such that UV treatment in the system consists of emission of the UV light into the potable water in the flow path upstream of the adsorption module by the UV treatment module, and
   wherein the first portion of the flow path is defined at least in part by a UV transparent wall.

15. The system of claim 14, wherein the adsorption medium comprises a mixed bed of two or more of activated carbon, zeolites and/or silicon oxide particles in an adsorption module.

16. The system of claim 14, wherein the UV light source and the flow path are separated by the UV transparent wall that is disposed around the UV light source, and the flow path surrounds the UV transparent wall.

17. The system of claim 16, wherein the flow path has the annular shape and is positioned between the UV transparent wall and a reflective wall that surrounds the annular flow path.

18. The system of claim 14, wherein the flow path has the spiral shape surrounding the UV light source.

19. The system of claim 14, wherein the POE from the chlorinated public water supply is a household POE.

20. The system of claim 14, wherein the POE from the chlorinated public water supply is a commercial POE.

\* \* \* \* \*